(12) United States Patent
Wuu et al.

(10) Patent No.: US 12,724,180 B2
(45) Date of Patent: Sep. 1, 2026

(54) BRIGHTNESS ENHANCEMENT FILM

(71) Applicant: National Chung Hsing University, Taichung City (TW)

(72) Inventors: Dong-Sing Wuu, Taichung City (TW); Fang-Hsuan Su, Taichung City (TW)

(73) Assignee: National Chung Hsing University, Taichung City (TW)

( * ) Notice: Subject to any disclaimer, the term of this patent is extended or adjusted under 35 U.S.C. 154(b) by 267 days.

(21) Appl. No.: 18/584,224

(22) Filed: Feb. 22, 2024

(65) Prior Publication Data

US 2025/0028096 A1 Jan. 23, 2025

(30) Foreign Application Priority Data

Jul. 19, 2023 (TW) ................................ 112126969

(51) Int. Cl.
*G02B 5/02* (2006.01)
*G02B 5/04* (2006.01)

(52) U.S. Cl.
CPC .......... *G02B 5/0247* (2013.01); *G02B 5/045* (2013.01)

(58) Field of Classification Search
CPC ................................................... G02B 5/0247
See application file for complete search history.

(56) References Cited

U.S. PATENT DOCUMENTS

| | | | | |
|---|---|---|---|---|
| 2010/0027294 | A1* | 2/2010 | Lee | G02B 5/02 445/24 |
| 2018/0348411 | A1* | 12/2018 | Yamaki | G02B 5/0278 |
| 2020/0379159 | A1* | 12/2020 | Li | G02B 6/0053 |
| 2021/0406496 | A1* | 12/2021 | Tao | H01L 23/60 |

* cited by examiner

*Primary Examiner* — Edmond C Lau
(74) *Attorney, Agent, or Firm* — Blank Rome LLP

(57) ABSTRACT

A brightness enhancement film adapted to be disposed on a light-exiting surface of a light-emitting module includes a substrate and a brightness enhancement structure. The substrate is light transmissive, is disposed on the light-exiting surface, and has a top surface away from the light-exiting surface. The brightness enhancement structure is disposed on the top surface of the substrate, and includes a plurality of prism portions, a plurality of pores distributed inside each of the plurality of prism portions, and a plurality of modified patterns formed downwardly from a surface of each of the plurality of prism portions.

20 Claims, 6 Drawing Sheets
(1 of 6 Drawing Sheet(s) Filed in Color)

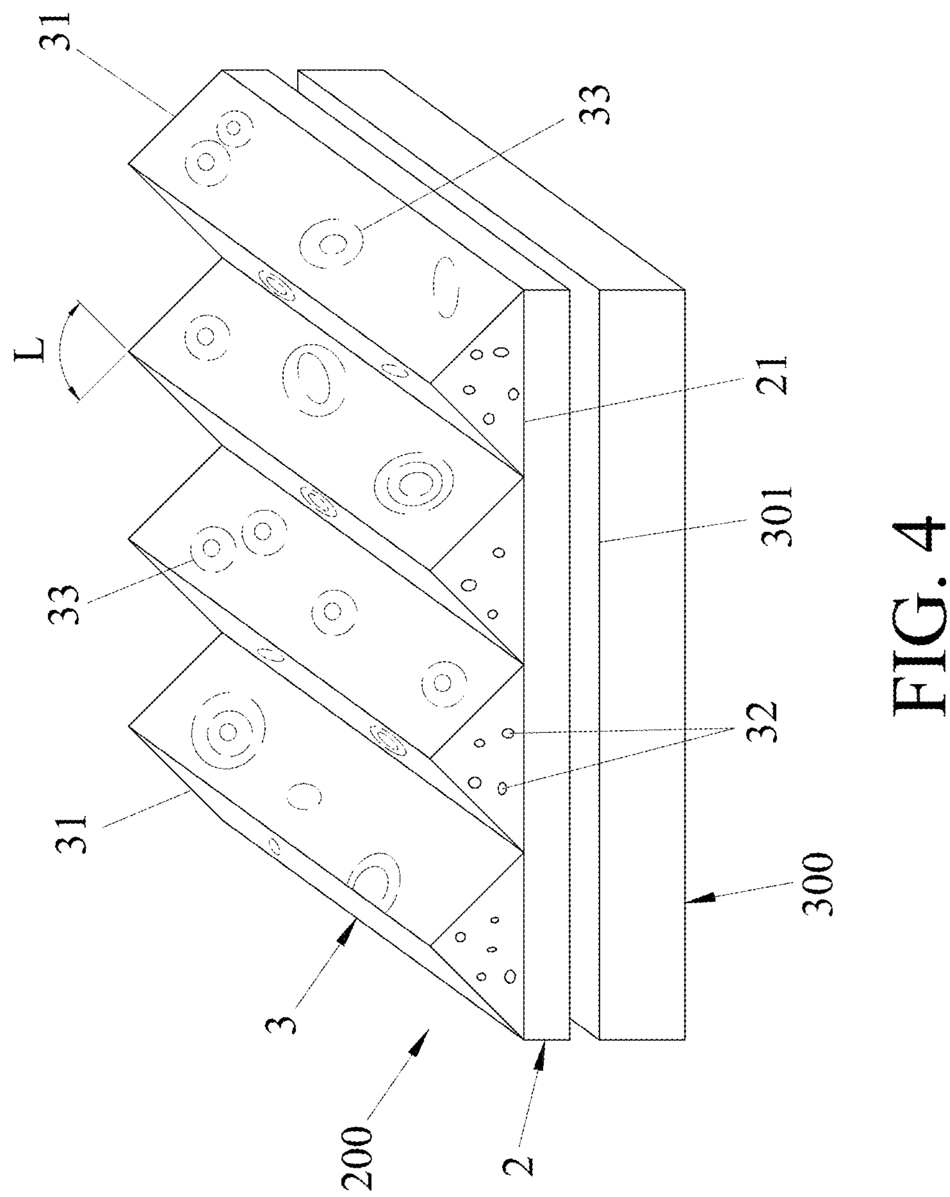
FIG. 4
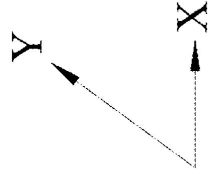

BRIGHTNESS ENHANCEMENT FILM

CROSS-REFERENCE TO RELATED APPLICATION

This application claims priority to Taiwanese Invention Patent Application No. 112126969, filed on Jul. 19, 2023, the entire disclosure of which is incorporated by reference herein.

FIELD

The disclosure relates to a brightness enhancement film, and more particularly to a brightness enhancement film adapted to be disposed on a light-emitting module.

BACKGROUND

Referring to FIGS. 1 and 2, a back light module usually includes a brightness enhancement film (BET) 11 that is disposed on a light-exiting surface (not shown) of the back light module to enhance exiting light intensity in a forward direction perpendicular to the light-exiting surface, and a diffusion film 12 that is disposed on a side of the brightness enhancement film 11 adjacent to the light-exiting surface of the back light module. The brightness enhancement film 11 generally includes a light-transmissive substrate 111 that is disposed on the light-exiting surface, and a prism structure 112 that is disposed on a surface of the light-transmissive substrate 111 opposite to the light-exiting surface. When light emitted from the light-exiting surface is guided into the prism structure 112, the light is reflected several times within the prism structure 112 because of the structural design of the prism structure 112 and the difference of the refractive indices between the prism structure 112 and the external environment, and then the light is eventually emitted from the prism structure 112 in the forward direction. As shown in FIG. 1, the diffusion film 12 may have a rough surface 121 having a diffusion function, or as shown in FIG. 2, the diffusion film 12 may be mixed with a plurality of diffusion particles 122, which allow diffusion to be formed when the light passes through the diffusion film 12, thereby emitting the light in a uniform manner.

However, although the light that is reflected several times within the prism structure 112 may increase the exiting light intensity in the forward direction, a path of the light within the prism structure 112 is lengthened, resulting some colors of the light being absorbed by components of the back light module, thereby causing color deviation. Although the diffusion film 12 may enable the light to be emitted uniformly, such configuration requires tedious processing and is not conducive to reducing the thickness of the components of the backlight module as a whole.

SUMMARY

Therefore, an object of the disclosure is to provide a brightness enhancement film that can alleviate at least one of the drawbacks of the prior art.

According to the disclosure, the brightness enhancement film adapted to be disposed on a light-exiting surface of a light-emitting module includes a substrate and a brightness enhancement structure.

The substrate is light transmissive, is disposed on the light-exiting surface, and has a top surface away from the light-exiting surface.

The brightness enhancement structure is disposed on the top surface of the substrate, and includes a plurality of prism portions, a plurality of pores distributed inside each of the plurality of prism portions, and a plurality of modified patterns formed downwardly from a surface of each of the plurality of prism portions.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Other features and advantages of the disclosure will become apparent in the following detailed description of the embodiment(s) with reference to the accompanying drawings. It is noted that various features may not be drawn to scale.

FIG. 4 is a schematic perspective view illustrating the embodiment of the brightness enhancement film according to the disclosure.

DETAILED DESCRIPTION

Figure 1:
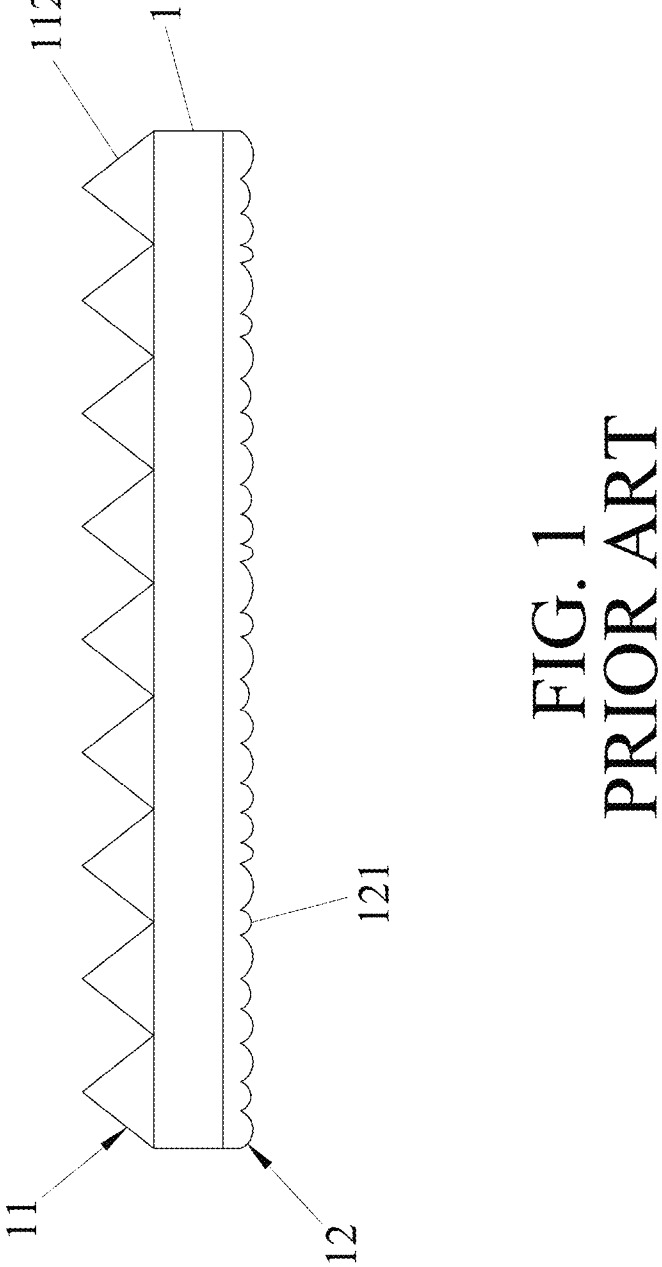
FIGS. 1 and 2 are schematic side views illustrating a structure of a conventional brightness enhancement film.
Figure 2:
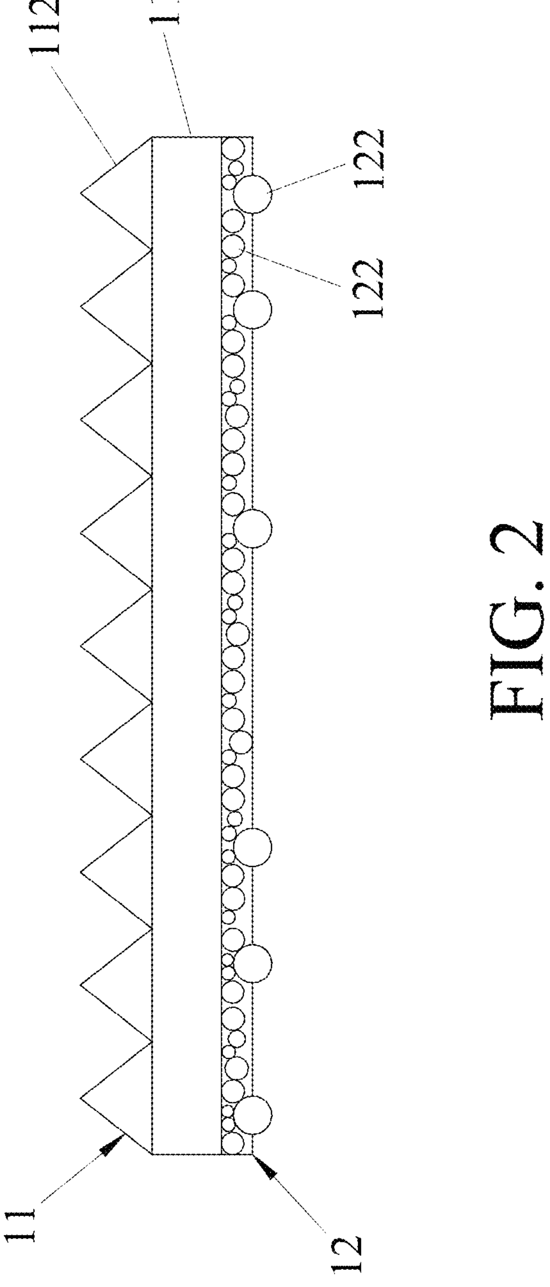

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 3:
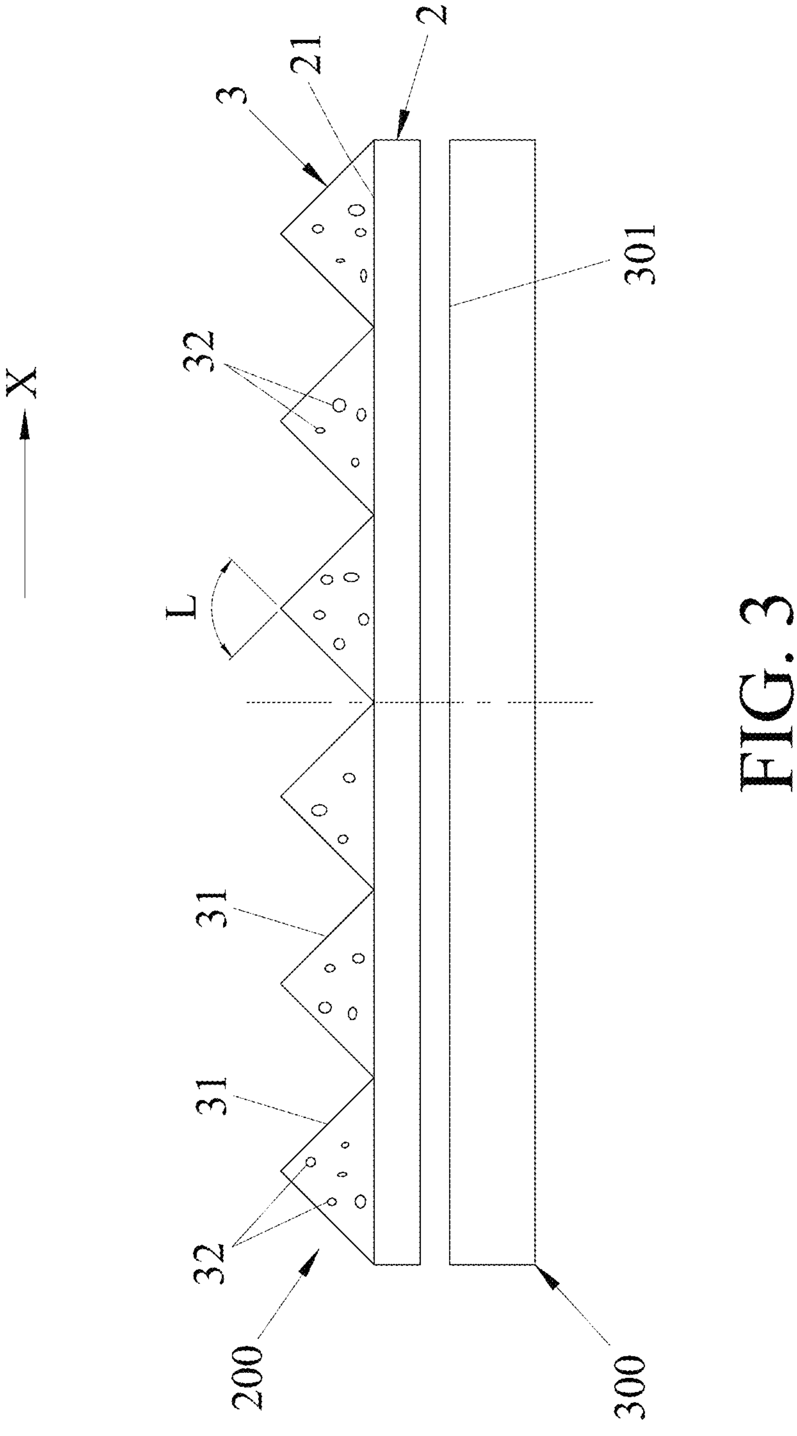
FIG. 3 is a schematic side view illustrating an embodiment of a brightness enhancement film according to the disclosure.

Referring to FIGS. 3 to 4, an embodiment of a brightness enhancement film 200 is provided and is adapted to be disposed on a light-exiting surface 301 of a light-emitting module 300. In this embodiment, the light-emitting module 300 is a backlight module, and the brightness enhancement film 200 includes a substrate 2 and a brightness enhancement structure 3.

The substrate 2 is light transmissive, is disposed on the light-exiting surface 301, and has a top surface 21 away from the light-exiting surface 301. The substrate 2 may be a rigid glass substrate, a sapphire substrate, or a flexible polymer substrate. The polymer substrate may be made of a polymer material such as polyethylene terephthalate (PET), polycarbonate (PC), or cellulose triacetate (TAC).

The brightness enhancement structure 3 is disposed on the top surface 21 of the substrate 2, and includes a plurality of prism portions 31 arranged along a first direction (X), a plurality of pores 32 distributed inside each of the plurality of prism portions 31, and a plurality of modified patterns 33 formed downwardly from a surface of each of the plurality of prism portions 31.

Specifically, each of the prism portions 31 extends in a second direction (Y) perpendicular to the first direction (X). Each of the plurality of prism portions 31 has a vertex with an angle ranging from 80 degrees to 100 degrees. A distance between two adjacent ones of the vertexes of the plurality of prism portions 31 ranges from 10 μm to 100 μm. In some embodiments, each of the plurality of prism portions 31 has a vertex with an angle of 90 degrees, which may facilitate light emitted to the prism portions 31 from the backlight module 300, after being reflected several times within the prism portions 31, to exit from the light-exiting surface 301 at a right angle (i.e., in a direction perpendicular to the light-exiting surface 301), thereby increasing exiting light intensity of the backlight module 300.

In this embodiment, each of the plurality of prism portions 31 is made of a light-cured resin, is manufactured by UV imprinting, and has a refractive index that ranges from 1.45 to 1.7.

The pores 32 are adapted to enhance a penetration rate of the prism portions 31, so that when the light passes through the prism portions 31, the number of times that the light reflects within the prism portions 31 may be reduced, which in turn may significantly shorten the path of the light from the light-emitting module 300 to the brightness enhancement film 200, so as to mitigate the problem of some colors of the light being absorbed by the materials (e.g., the substrate 2 or the prism portions 31), and thus inhibit the occurrence of color deviation. A diameter of each of the plurality of pores 32 ranges from 10 nm to 500 nm, and porosity of the plurality of prism portions 31 is no greater than 10%. A refractive index of each of the plurality of pores 32 is smaller than a refractive index of each of the plurality of prism portions 31. In some embodiments, the porosity of the plurality of prism portions 31 ranges from 1.5% to 5%.

In detail, in this embodiment, each of the plurality of pores 32 is filled with air and has the refractive index of 1, which is smaller than the refractive index of each of the plurality of prism portions 31 (i.e., from 1.45 to 1.7). Therefore, when the light emitted from the light-emitting module 300 is introduced into the brightness enhancement structure 3 and encounters the pores 32, the path of the light changes, so that the probability of a total internal reflection (TIR) of the light occurring within the prism portions 31 is reduced, so the light may pass through the prism portions 31 via a shorter path and the occurrence of red shift is inhibited, thereby improving color deviation.

In some embodiments, the porosity of the prism portions 31 is 2.5%.

It should be noted that, when the porosity of the prism portions 31 is greater than 10%, the light may not be able to be emitted at the right angle, thereby not being helpful in improving the exiting light intensity of the light-emitting module 300.

The plurality of modified patterns 33 are formed downwardly from the surface of each of the plurality of prism portions 31, and are distributed randomly on the surface of each of the plurality of prism portions 31, so as to scatter the light, thereby allowing the light to be emitted in a uniform manner. In addition, by having the modified patterns 33 that modify the surface of each of the prism portions 31, light scattering is enhanced, thereby improving quality of front-of-screen (FOS) of the light-emitting module 300. A depth of each of the plurality of modified patterns 33 from the surface of a respective one of the prism portions 31 is no greater than 0.5 μm.

In detail, each of the modified patterns 33 has multiple rings or multiple ripples. In some embodiments, each of the plurality of modified patterns 33 has multiple rings formed one around another, wherein each of the rings has a diameter ranging from 1 μm to 10 μm. The modified patterns 33 may be the same or different in size and shape. For example, each of the modified patterns 33 may be composed of multiple rings, or may be composed of a circular pattern and at least one ring around the circular pattern, but is not limited thereto. In other embodiments, when some of the modified patterns 33 are smaller in size, each of them may be composed of only a single ring pattern or a single circle pattern.

The brightness enhancement film 200 of the present disclosure is further illustrated by the following Examples 1 to 3 (E1-E3), and Comparative Examples 1 to 3 (CE1-CE3). It should be understood, however, that the Examples are for illustrative purposes only and should not be construed as a limitation on the implementation of the present disclosure.

In Example 1 (E1), as shown in FIGS. 3 and 4, the brightness enhancement film 200 includes the substrate 2 and the brightness enhancement structure 3. The brightness enhancement structure 3 is disposed on the top surface 21 of the substrate 2, and includes the plurality of prism portions 31, the plurality of pores 32 distributed inside each of the plurality of prism portions 31, and the plurality of modified patterns 33 formed downwardly from the surface of each of the plurality of prism portions 31. The porosity of the plurality of pores 32 is 1.5%.

The structure of the brightness enhancement film 200 of each of Examples 2 and 3 (E2 and E3) is substantially the same as that of Example 1 (E1), except that the porosity of the prism portions 31 of Example 2 (E2) is 2.5%, and the porosity of the prism portions 31 of Example 3 (E3) is 5%.

A brightness enhancement film of Comparative Example 1 (CE1) is similar in structure to the brightness enhancement film 200 of Example 1 (E1), except that a brightness enhancement structure of the brightness enhancement film of Comparative Example 1 (CE1) does not have pores or modified patterns. A brightness enhancement film of each of Comparative Examples 2 and 3 (CE2 and CE3) is the same as that of Comparative Example 1 (CE1), except that the brightness enhancement film of Comparative Example 2 (CE2) further includes a diffusion layer disposed on a surface of a substrate opposite to a brightness enhancement structure and having a haze of 20%, and except that prism portions of Comparative Example 3 (CE3) are mixed with a plurality of diffusion particles therein.

Figure 5:
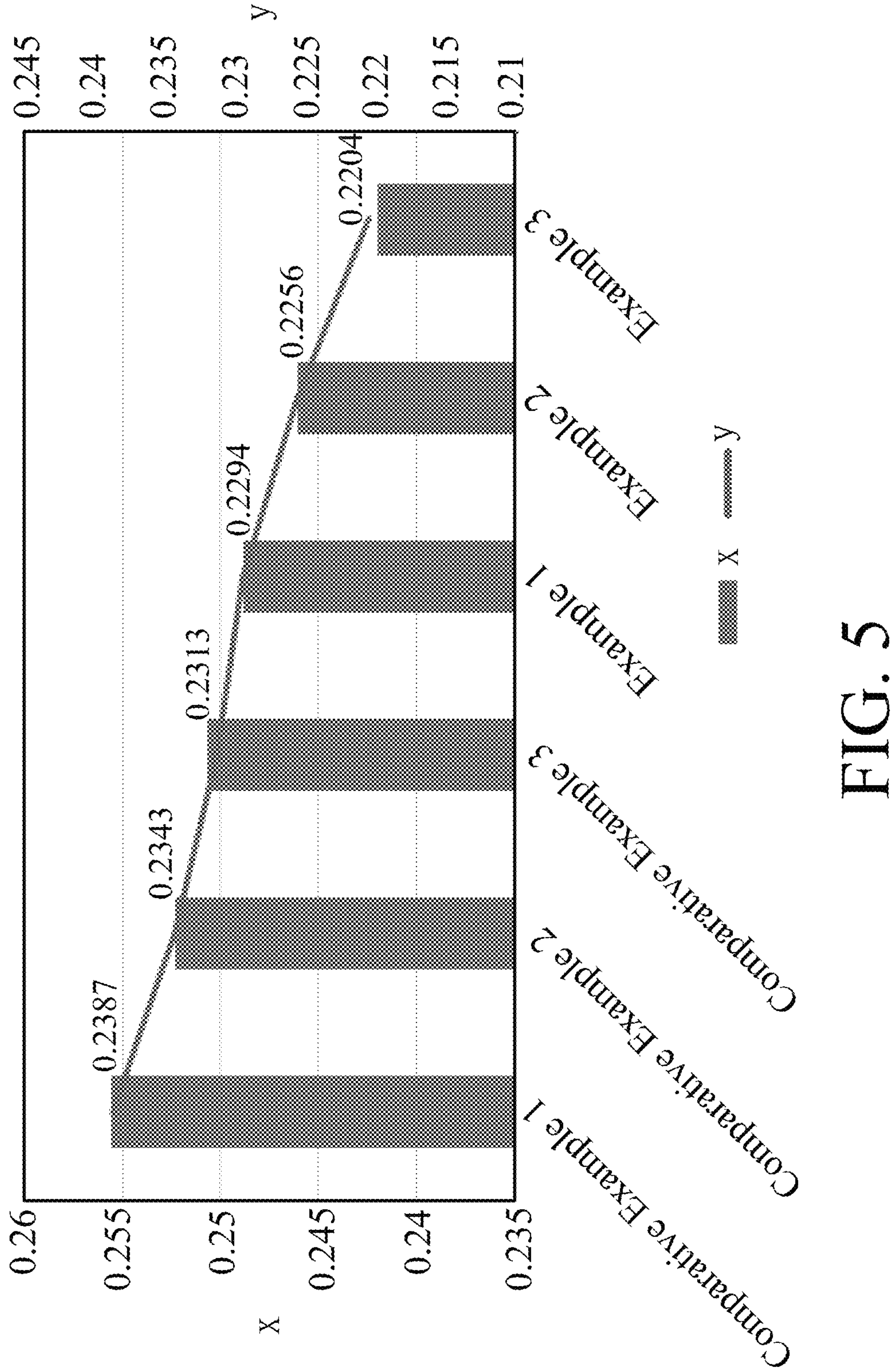
FIG. 5 is a bar chart illustrating chromaticity parameters (x, y) of each of Examples 1 to 3 and Comparative Examples 1 to 3.

Next, a haze meter (Manufacturer: NIPPON DENSHOKU; Model no.: NDH 5000) was used to measure total light transmittance (TT), parallel transmittance (PT), diffuse transmittance (DT), and haze value for the brightness enhancement film of each of Examples 1 to 3 (E1-E3) and Comparative Examples 1 to 3 (CE1-CE3), and the results are shown in Table 1. A luminance colorimeter (Manufacturer: TOPCON; Model No.: BM-7 series) was used to measure chromaticity parameters for the brightness enhancement film of each of Examples 1 to 3 (E1-E3) and Comparative Examples 1 to 3 (CE1-CE3), and the results are shown in FIG. 5.

When measuring the chromaticity parameters, a reference parameter was first measured at a random position on the light-exiting surface 301 of the light-emitting module 300. Next, the brightness enhancement film of each of Examples and Comparative Examples was disposed on the light-exiting surface 301, and then the luminance colorimeter was used to measure the chromaticity parameters (x, y) at the same position. The chromaticity parameters (x, y) were used as coordinates to construct a CIE 1931 chromaticity diagram (see FIG. 6). The higher the values of the chromaticity parameters (x, y), the redder or yellower a color is; the lower the values of the chromaticity parameters (x, y), the bluer a color is.

TABLE 1

| Unit (%) | CE1 | CE2 | CE3 | E1 | E2 | E3 |
|---|---|---|---|---|---|---|
| TT | 5.96 | 7.58 | 15.13 | 18.56 | 31.54 | 51.09 |
| PT | 0.89 | 1.07 | 2.02 | 2.77 | 4.37 | 6.76 |
| DT | 5.07 | 6.51 | 13.11 | 15.79 | 27.17 | 44.37 |
| Haze | 85.07 | 85.88 | 85.65 | 85.08 | 86.14 | 86.85 |

As can be seen from Table 1, compared to the brightness enhancement film of Comparative Example 2 or 3 (CE2 or CE3), which has a haze value ranging from 85% to 86% by using a diffusion film or the diffusion particles to achieve a diffusion effect, the brightness enhancement film 200 of each of Examples 1 to 3 (E1-E3) has a haze value ranging from 85% to 87% by having the modified patterns 33 on the surfaces of the prism portions 31. The brightness enhancement film 200 achieves sufficient diffusion and modifies the surfaces of the prism portions 31, so compared to conventional brightness enhancement films (e.g., Comparative Examples 1 to 3), there is no need to include the diffusion layer, thereby avoiding tedious processing and enabling the brightness enhancement film 200 to be more lightweight. In addition, the diffusion transmittance (DT) of the brightness enhancement film 200 of each of Examples 1 to 3 (E1-E3) is higher than those of each of Comparative Examples 1 to 3 (CE1-CE3). It can be seen that the pores 32 and the modified patterns 33 facilitate light diffusion and uniformity of exiting light. As can be seen from Table 1 and FIG. 5, as the transmittance (i.e., TT, PT, and DT) of the brightness enhancement film 200 is increased, the chromaticity parameters (x, y) gradually decrease. Therefore, it can be seen that, in each of Examples 1 to 3, as the pores 32 of the brightness enhancement film 200 are increased (i.e., the porosity is increased), the number of times that the light reflects within the prism portions 31 is decreased, thereby effectively reducing the occurrence of red shift.

Figure 6:
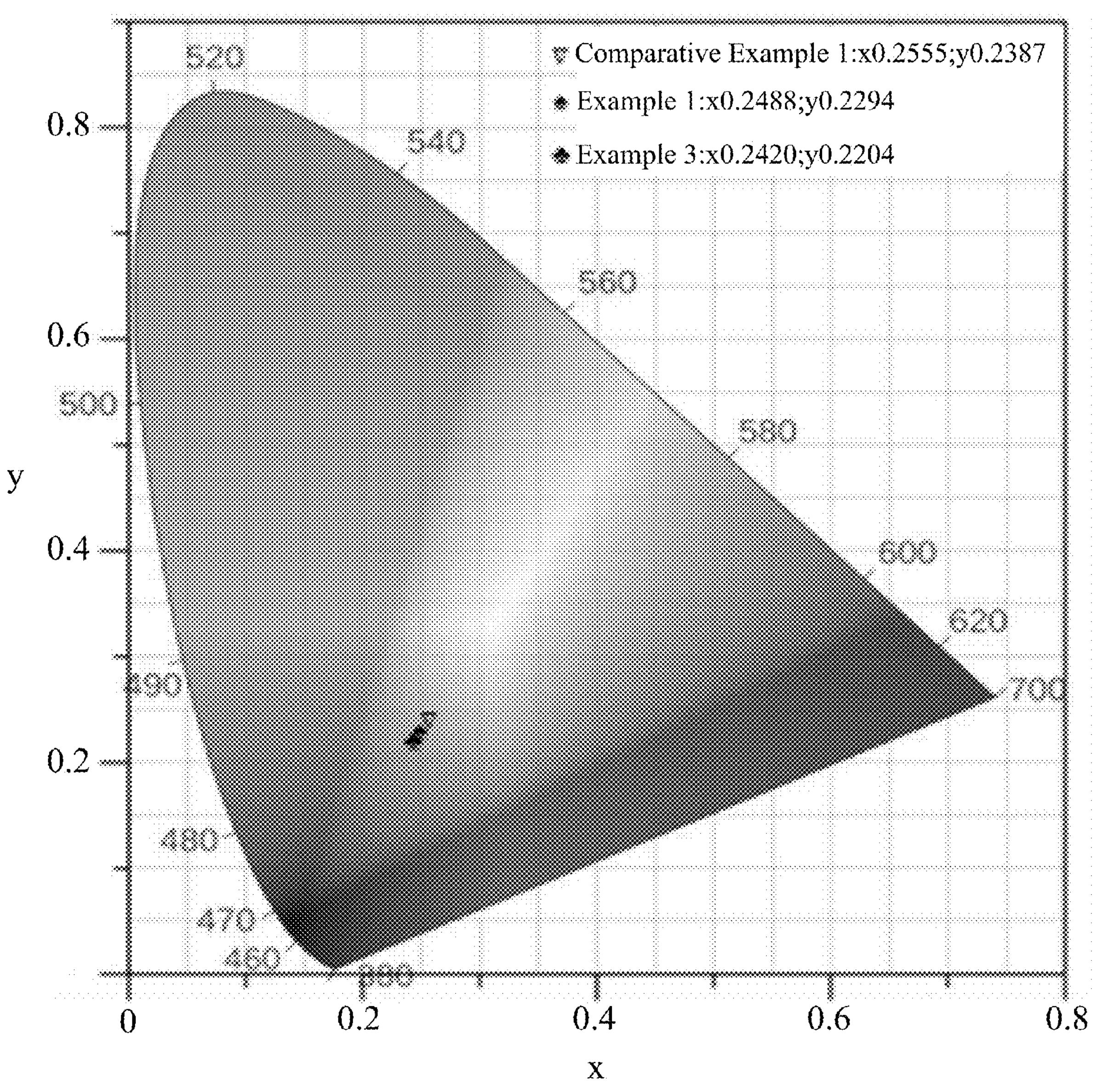
FIG. 6 is a CIE 1931 chromaticity diagram illustrating coordinates of each of Examples 1 to 3 and Comparative Example 1.

Referring to FIG. 6, the chromaticity parameters (x, y) of Comparative Example 1 and Examples 1 to 3 are plotted as coordinates in the CIE 1931 chromaticity diagram. As compared to the chromaticity parameters (x, y) of Comparative Example 1, the chromaticity parameters (x, y) of Examples 1 to 3 are smaller; therefore, positions of the coordinates of Examples 1 to 3 are farther away from the red color space and closer to the blue color space. Thus, compared to the brightness enhancement film of Comparative Example 1, which does not have the pores 32 or the modified patterns 33, the brightness enhancement film 200 of each of Examples 1 to 3 effectively inhibits the occurrence of red shift, so color deviation is improved.

In summary, by virtue of the pores 32 formed inside the prism portions 31, the number of times that the light reflects within the prism portions 31 is decreased, the path of the light is shortened, thereby effectively preventing color deviation. In addition, by virtue of the modified patterns 33 that modify the surface of each of the prism portions 31, light scattering is enhanced, so the diffusion film is not needed. Thus, the purpose of the disclosure is achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A brightness enhancement film adapted to be disposed on a light-exiting surface of a light-emitting module, comprising:

a substrate that is light transmissive, that is disposed on said light-exiting surface, and that has a top surface away from said light-exiting surface; and a brightness enhancement structure that is disposed on said top surface of said substrate, and that includes a plurality of prism portions, a plurality of pores distributed inside each of said plurality of prism portions, and a plurality of modified patterns formed downwardly from a surface of each of said plurality of prism portions, wherein each of said plurality of modified patterns has multiple rings formed one around another, each with a diameter ranging from 1 μm to 10 μm.

2. The brightness enhancement film as claimed in claim 1, wherein a diameter of each of said plurality of pores ranges from 10 nm to 500 nm, and porosity of said plurality of prism portions is no greater than 10%.

3. The brightness enhancement film as claimed in claim 1, wherein each of said modified patterns has multiple ripples.

4. The brightness enhancement film as claimed in claim 1, wherein a depth of each of said plurality of modified patterns from said surface of a respective one of said prism portions is no greater than 0.5 μm.

5. The brightness enhancement film as claimed in claim 1, wherein each of said plurality of prism portions has a vertex with an angle ranging from 80 degrees to 100 degrees, and a distance between two adjacent ones of said vertexes of said plurality of prism portions ranges from 10 μm to 100 μm.

6. The brightness enhancement film as claimed in claim 1, wherein a refractive index of each of said plurality of pores is smaller than a refractive index of each of said plurality of prism portions.

7. The brightness enhancement film as claimed in claim 6, wherein each of said plurality of pores is filled with air and has a refractive index of 1, each of said plurality of prism portions being made of a light-cured resin and having a refractive index that ranges from 1.45 to 1.7.

8. A brightness enhancement film adapted to be disposed on a light-exiting surface of a light-emitting module, comprising:

a substrate that is light transmissive, that is disposed on said light-exiting surface, and that has a top surface away from said light-exiting surface; and a brightness enhancement structure that is disposed on said top surface of said substrate, and that includes a plurality of prism portions, a plurality of pores distributed inside each of said plurality of prism portions, and a plurality of modified patterns formed downwardly from a surface of each of said plurality of prism portions, wherein a depth of each of said plurality of modified patterns from said surface of a respective one of said prism portions is no greater than 0.5 μm.

9. The brightness enhancement film as claimed in claim 8, wherein a diameter of each of said plurality of pores ranges from 10 nm to 500 nm, and porosity of said plurality of prism portions is no greater than 10%.

10. The brightness enhancement film as claimed in claim 8, wherein each of said modified patterns has multiple rings.

11. The brightness enhancement film as claimed in claim 8, wherein each of said modified patterns has multiple ripples.

12. The brightness enhancement film as claimed in claim 8, wherein a depth of each of said plurality of modified patterns from said surface of a respective one of said prism portions is no greater than 0.5 μm.

13. The brightness enhancement film as claimed in claim 8, wherein each of said plurality of prism portions has a vertex with an angle ranging from 80 degrees to 100 degrees, and a distance between two adjacent ones of said vertexes of said plurality of prism portions ranges from 10 μm to 100 μm.

14. The brightness enhancement film as claimed in claim 8, wherein a refractive index of each of said plurality of pores is smaller than a refractive index of each of said plurality of prism portions.

15. A brightness enhancement film adapted to be disposed on a light-exiting surface of a light-emitting module, comprising:

a substrate that is light transmissive, that is disposed on said light-exiting surface, and that has a top surface away from said light-exiting surface; and a brightness enhancement structure that is disposed on said top surface of said substrate, and that includes a plurality of prism portions, a plurality of pores distributed inside each of said plurality of prism portions, and a plurality of modified patterns formed downwardly from a surface of each of said plurality of prism portions, wherein each of said plurality of pores is filled with air and has a refractive index of 1, each of said plurality of prism portions being made of a light-cured resin and having a refractive index that ranges from 1.45 to 1.7.

16. The brightness enhancement film as claimed in claim 15, wherein a diameter of each of said plurality of pores ranges from 10 nm to 500 nm, and porosity of said plurality of prism portions is no greater than 10%.

17. The brightness enhancement film as claimed in claim 15, wherein each of said modified patterns has multiple rings.

18. The brightness enhancement film as claimed in claim 15, wherein each of said modified patterns has multiple ripples.

19. The brightness enhancement film as claimed in claim 15, wherein a depth of each of said plurality of modified patterns from said surface of a respective one of said prism portions is no greater than 0.5 μm.

20. The brightness enhancement film as claimed in claim 15, wherein each of said plurality of prism portions has a vertex with an angle ranging from 80 degrees to 100 degrees, and a distance between two adjacent ones of said vertexes of said plurality of prism portions ranges from 10 μm to 100 μm.

* * * * *